United States Patent Office 3,384,202
Patented May 21, 1968

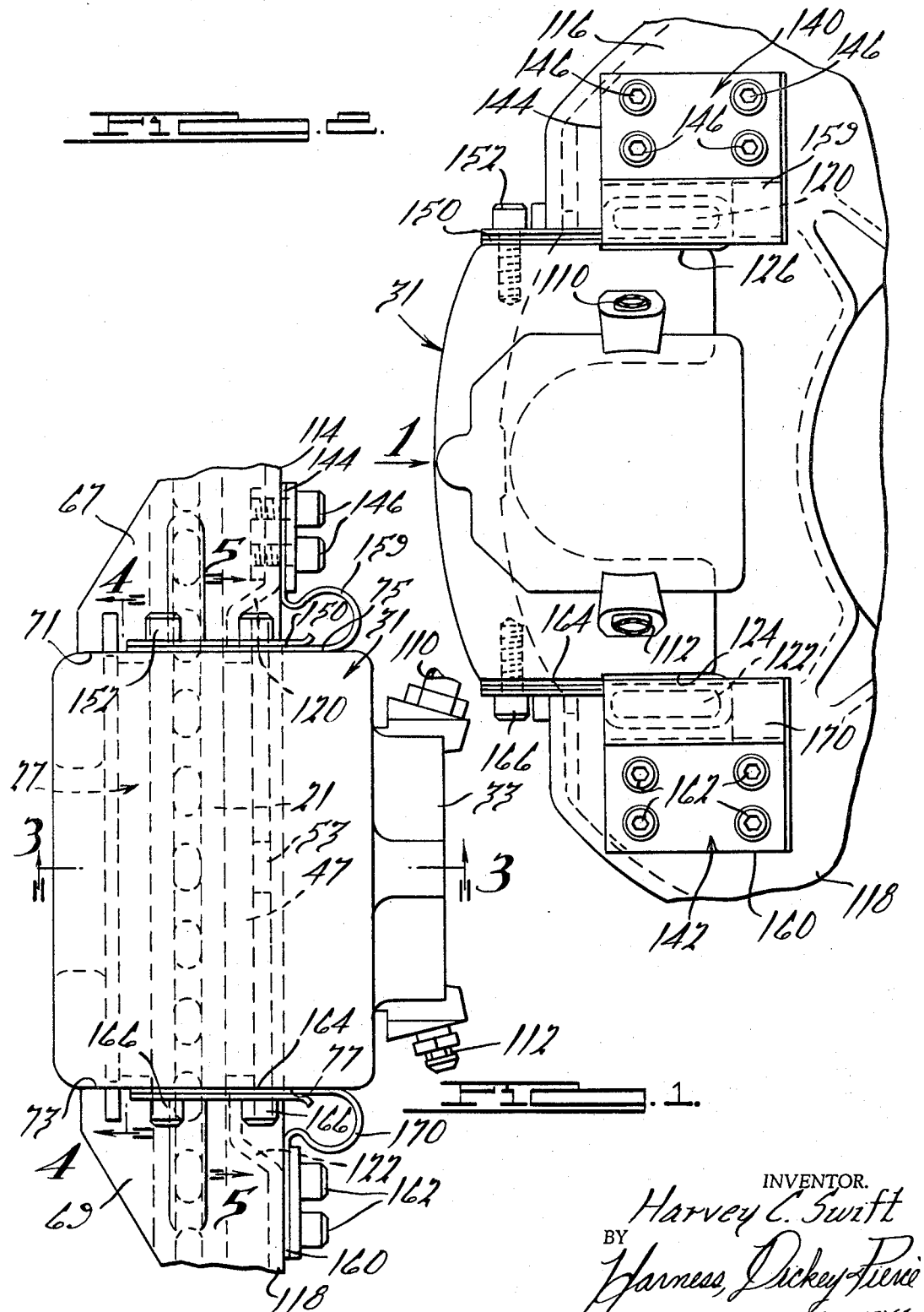

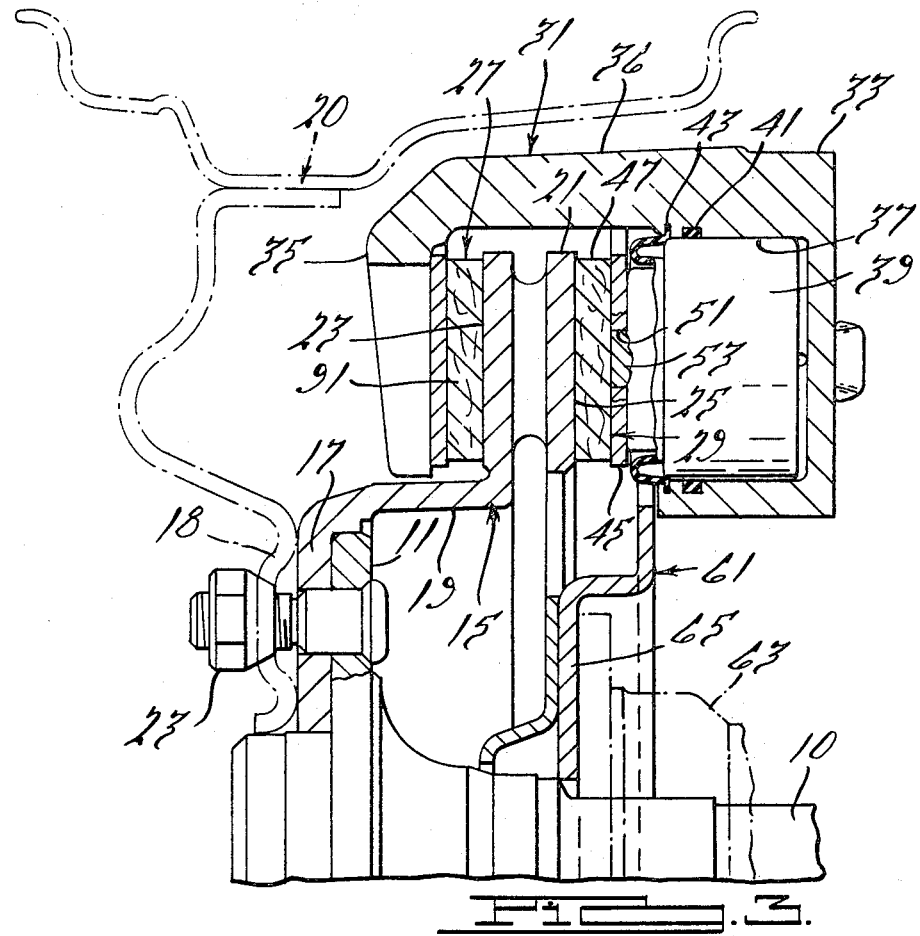
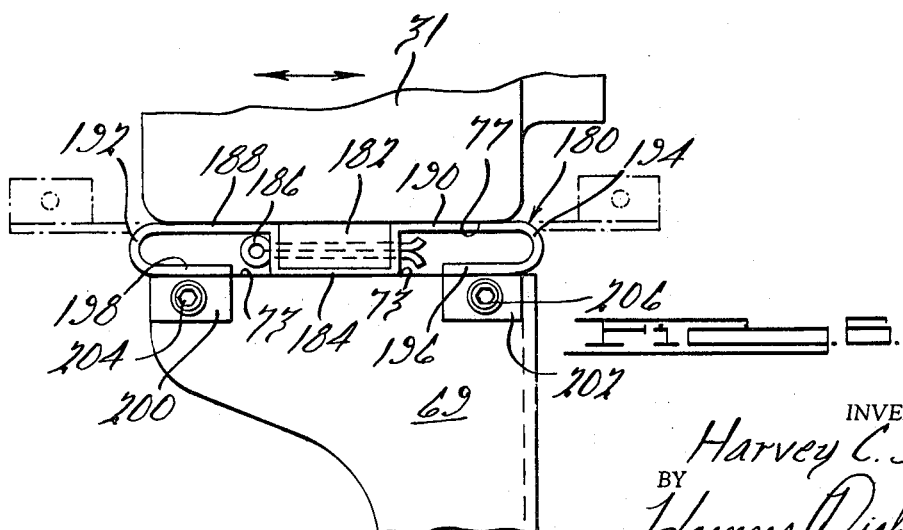

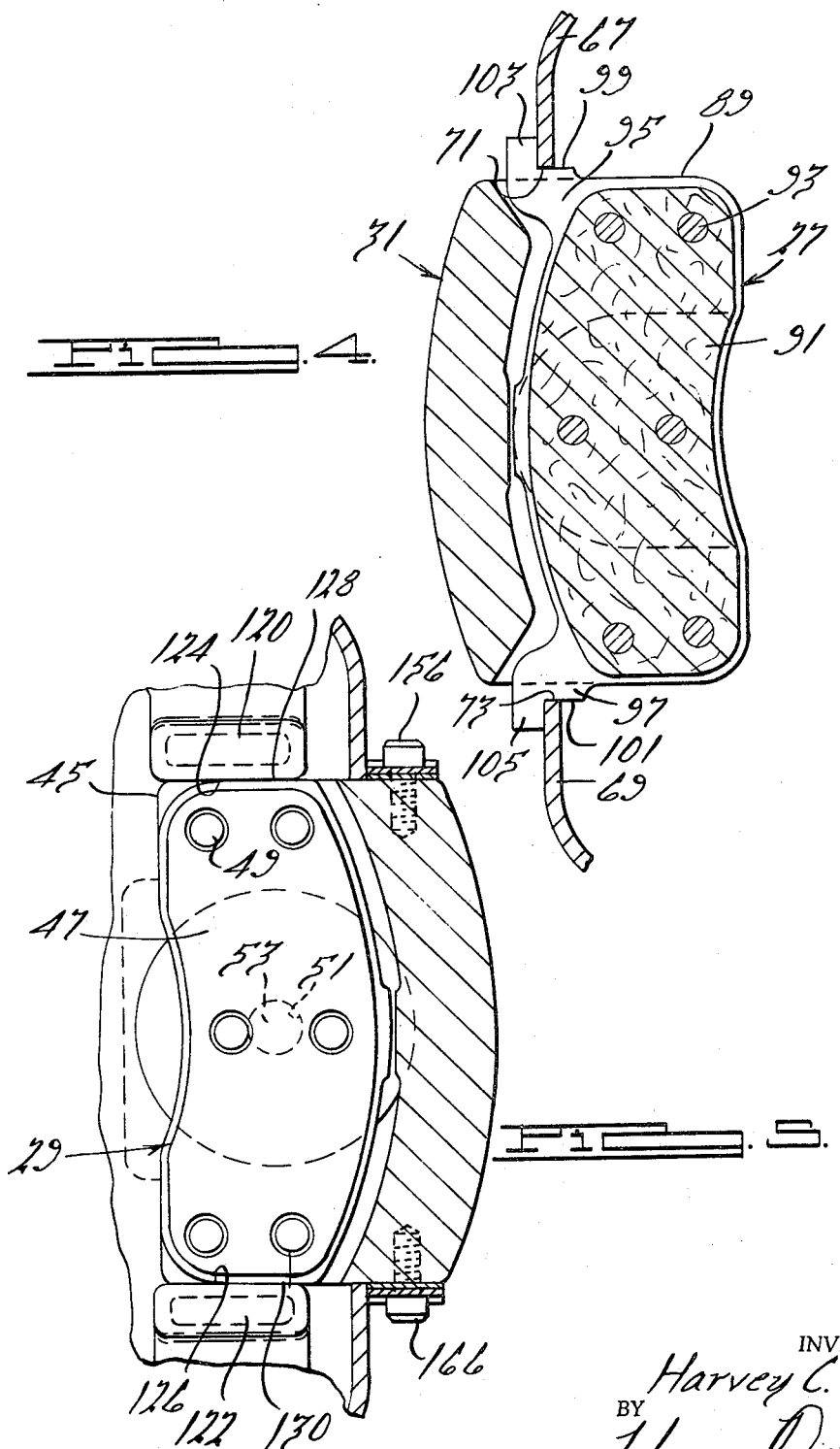

3,384,202
SUPPORT FOR DISK BRAKE CALIPER
Harvey C. Swift, Birmingham, Mich., assignor to Kelsey-Hayes Company, Romulus, Mich., a corporation of Delaware
Filed Feb. 23, 1967, Ser. No. 618,064
7 Claims. (Cl. 188—73)

ABSTRACT OF THE DISCLOSURE

A disk brake in which a caliper having a fluid motor portion and a reaction portion is mounted on a stationary torque plate for movement in a direction generally perpendicular to the plane of rotation of a rotary disk to be braked. The caliper is supported for this movement on a stationary torque plate by yieldable means and the movement of the caliper with respect to the torque plate is brought about by the action of a fluid motor which causes a pair of brake shoes to come into engagement with opposite faces of the disk to be braked thereby providing braking action on the disk.

BACKGROUND OF THE INVENTION

Field of the invention

This invention relates to a disk brake of the sliding caliper type in which the caliper is supported for sliding movement on a stationary torque plate by yieldable means.

DESCRIPTION OF THE PRIOR ART

In certain prior art disk brakes known to the applicant, a stationary torque plate supports a caliper for slidable movement in a direction generally perpendicular to the plane of rotation of a disk to be braked. Yieldable means in the form of flexible straps couple the stationary torque plate with the slidable caliper so that the slidable caliper is supported on the torque plate for slidable movement relative thereto by these flexible straps. In order to actuate the brakes and bring each of the brake shoes into engagement with opposite sides of the rotary disk, the flexible straps must flex in a direction generally perepndicular to the plane of rotation of the disk to be braked. In these prior art devices, there is resistance to the movement of the caliper due to the physical characteristic of the flexible straps and due to the necessity for bending these straps with a certain amount of force. Also, due to the characteristics of the flexible straps there is a certain amount of hysterisis involved so that the caliper may not return to its original position when the braking system is relaxed.

The present invention overcomes the above mentioned difficulties by providing flexible straps in the form of springs that provide negligible resistance to movement of the caliper with respect to the torque plate when the brakes are actuated. As a result, there is no load on the caliper that must be overcome when the braking system is actuated and there is no hysterisis effect involved which will prevent the caliper from returning to its proper position when the brake system is in its relaxed state.

The springs of the present invention that support the caliper on the torque plate have loops positioned therein which will permit the ends of the springs to move relative to each other by a rolling movement of the loop formed in the spring. This rolling action is substantially free of any resistance and by the same token, the hysterisis effect in the spring is negligible since the rolling action will take place when the caliper moves in either direction with respect to the torque plate.

SUMMARY

In the present invention, a caliper having a fluid motor portion positioned on one side of the disk to be braked and a reaction portion positioned on the other side of a disk to be braked is supported on a stationary torque plate for movement in a direction generally perpendicular to the plane of rotation of the disk. The fluid motor portion of the caliper has a fluid operated piston positioned therein for moving a first brake shoe into engagement with one of the faces of the rotary disk, while the reaction portion has a brake shoe positioned adjacent thereto for movement into engagement with the other face of the rotary disk to be braked when the fluid motor is actuated. The caliper is supported for sliding movement in a direction generally perpendicular to the plane of rotation of the rotary disk to be braked by a pair of spring means that are positioned on either side of the caliper and which have one portion connected to the stationary torque plate and the other portion connected to the sliding caliper. These springs are provided with intermediate portions in the form of portions of loops which will roll when the caliper is moved with respect to the torque plate as the fluid operated piston is supplied with hydraulic fluid under pressure. As a result of this rolling action, the springs offer substantially no resistance to this movement and they have substantially no hysteresis so that the caliper may be returned to its original position after braking operations have been completed with substantially no resistance. As a result the above described construction, the disk brake of the present invention is operated very easily and may be returned to its inactive or inoperative state without substantial resistance.

BRIEF DESCRIPTION OF THE DRAWING

FIGURE 1 is an end elevational view taken in the direction of the arrow 1 shown in FIGURE 2;

FIGURE 2 is a side elevational view of the disk brake of the present invention;

FIGURE 3 is a sectional view taken along the lines 3—3 of FIGURE 1;

FIGURE 4 is a sectional view taken along the lines 4—4 of FIGURE 1;

FIGURE 5 is a sectional view taken along the lines 5—5 of FIGURE 1, and

FIGURE 6 is an elevational view of a modification of the present invention.

Referring now to the drawings in which like reference numerals designate like parts throughout the several views thereof, there is shown in FIGURE 3 a rotatable axle 10 having a radially extending flange 11.

A rotor 15 comprised of a radially inwardly extending flange 17, an axially extending flange 19 and a radially extending brake disk 21 is affixed to the radially extending flange 12 of the rotatable axle 10 by means of fastening assemblies preferably in the form of nut and bolt devices, one of which is shown at 23. As shown in the drawing (FIGURE 3), the nut and bolt assembly 23 passes through the radially extending flange 17 of the rotatable disk 15, through the radially extending flange 11 of the rotatable axle 10 and through a radially extending flange 18 of a wheel 20 to thereby couple the wheel 20 and the rotatable disk 15 to the rotatable axle 10. As a result, rotary motion is imparted to the wheel 20 and to the rotatable disk 15 as the rotatable axle 10 rotates.

The brake disk 21 has a first radially extending braking face 23 and a second radially extending braking face 25 which are positioned to permit a first brake shoe 27 and a second brake shoe 29 to come into engagement with these faces 23 and 25 as the brakes are energized. The braking action which results in the brake shoes 27 and 29 coming into engagement with the radially extending faces 23 and 25 will be brought out subsequently in the specification.

The disk brake of the present invention comprises a caliper 31 having a fluid motor portion 33 and a reaction portion 35 coupled by an intermediate portion 36. The fluid motor portion 33 includes a cylindrical bore 37 having a fluid operated piston 39 positioned therein with a rectangular resilient seal 41 being positioned between the outer surface of the piston 39 and the cylindrical bore 37. Furthermore, a boot 43 couples the piston 39 with the cylindrical bore 37 to provide a means for preventing contaminants from reaching the piston 39 and the cylindrical bore 37.

The brake shoe 29 is shown more specifically in FIGURE 5 and it comprises a backing plate 45 having a brake lining 47 affixed thereto by any suitable fastening means for example, by rivets 49. The backing plate 45 has a central bore 51 positioned therein that receives a cylindrical extension 53 positioned on the piston 39 which serves to support the brake shoe 29 so that the lining 47 is positioned in opposed relationship to the face 25 of the rotary disk 21.

A stationary torque plate 61 is suitably affixed to a stationary hub 63 by means of a radially inwardly extending flange 65 that rotatably supports the rotatable axle 10. This stationary torque plate 61 has spaced axially extending flanges 67 and 69 positioned thereon which extend in a direction generally parallel to the direction of movement of the piston 39. The axially extending flange 67 terminates in an axially extending shoulder 71, while the axially extending flange 69 terminates in an axially extending shoulder 73 to thereby provide circumferentially or chordally spaced shoulders. The caliper 31 has a first edge 75 positioned in slidable engagement with the shoulder 71 of the axially extending flange 67 and an opposed axially extending edge 77 positioned in slidable engagement with the axially extending shoulder 73 of the flange 69.

The second brake shoe 27 has a backing plate 89 and a brake lining 91, with the brake lining 91 being secured thereto through any suitable fastening means, for example, by rivets 93. The backing plate 89 has outwardly extending ears 95 and 97 with edge portions 99 and 101 positioned in engagement with the shoulders 71 and 73 formed on the axially extending flanges 67 and 69 respectively. The ears 95 and 97 also have tabs 103 and 105 that extend over the axially extending flanges 67 and 69 respectively to support the brake shoe 27 in opposed relationship to the reaction portion 35 of the slidable caliper 31.

As can best be seen by reference to FIGURES 1 and 2, an hydraulic inlet 110 is positioned in the fluid motor portion 33 of the caliper 31 to supply hydraulic fluid under pressure to the rear of the fluid operated piston 39. A restricted bleed opening or fitting 112 is also coupled to the fluid motor portion 33 and is in communication with the portion of the cylindrical bore 37 to the rear of piston 39 to thereby bleed off hydraulic fluid from the cylinder 37 when braking operations have been completed.

The caliper 31 is supported on the stationary torque plate 61, and more particularly on a main body portion 114 that extends in a plane generally parallel to the plane of rotation of the rotary disk 21. This main body portion 114 has spaced arms 116 and 118 respectively, which are integrally formed with the axially inwardly extending flanges 67 and 69. The arm 116 has an integrally formed inwardly positioned indentation 120 positioned therein, while the arm 118 has an inwardly extending indentation 122 positioned therein. These inwardly extending indentations 120 and 122 provide spaced shoulders 124 and 126 respectively, which are engageable with outwardly extending end portions 128 and 130 positioned on the backing plate 45 of the brake shoe 29. During braking operations, therefore, the braking torque that is applied to the brake lining 47 as it comes into engagement with the face 25 on the disk 21 is transferred to the stationary torque plate by means of the two spaced shoulders 124 and 126.

As can best be seen by reference to FIGURES 1, 2 and 5, the caliper 31 is supported on the stationary torque plate 61 for movement in a direction generally perpendicular to the plane of rotation of the disk 21 by a pair of spring means, one of which is designated by the numeral 140 and the other of which is designated by the numeral 142. The spring means 140 has a first planar portion 144 affixed to the arm 116 of the main body portion of the stationary torque plate 61 through spaced fastening means 146 in the form of machine screws. A second planar portion 150 of the spring means 140 is positioned at right angles with respect to the first planar portion 144 and is affixed to an axially extending edge surface 75 positioned on the caliper 31 by suitable fastening means, preferably in the form of machine screws 152. The first planar portion 144 and the second planar portion 150 are interconnected by an integrally formed loop or roll 159.

Similarly, the first planar portion 160 of the spring means 142 is affixed to the arm 118 of the stationary torque plate through fastening means 162 and the second planar portion of the spring means 142 which extends at substantially right angles to the first planar portion 160 is affixed to the axially extending surface 77 of the caliper 31 through spaced fastening means 166. The first planar portion 160 and the second planar portion 164 of the spring means 142 are connected by a loop or roll 170.

The spring means 140 and 142 are of the type in which rolling action takes place in the loops 159 and 170 as the end portions 144 and 160 respectively, move relatively to the end portions 150 and 164 respectfully, during braking action. It can be appreciated that during braking action, when fluid is applied to the piston 39, it moves the lining 47 of the first brake shoe 29 into engagement with the radial face 25 of the disk 21, while the reaction portion 35 moves the brake lining 91 of the second brake shoe 27 into engagement with the radial face 23 on the disk 21, as the reaction of the fluid in the cylinder 37 shifts the caliper 31 to the right as viewed in FIGURE 3.

The rolling action of the loops or rolls 159 and 170 provide substantially no resistance to this sliding movement of the caliper relative to the torque plate. Similarly, when the pressure of the hydraulic fluid is released, the caliper 31 may return to its neutral or relaxed position under the impetus of the rectangular seal 41 positioned between the piston 39 and the cylindrical bore 37 which has been distorted as the piston 39 moves toward the disk 21. Return of the caliper 31 to its original position is accomplished with negligble resistance from the spring members 140 and 142, since these spring members have substantially no hysterisis.

In the modified embodiment of the invention shown in FIGURE 6, a modified form of the spring means that couples the stationary torque plate 61 to slidable caliper 31 is shown. In this modified form of the invention, a spring 180 couples the stationary torque plate 61 and more particularly the axially extending flange 69 thereof to the caliper 31. In this form of the invention shown in FIGURE 6, only one edge of the caliper 31 is shown, but it should be understood, of course, that a similar spring couples the other edge of the caliper 31 to the other axially extending flange 67.

As shown the axially extending edge 77 of the caliper 31 has an outwardly extending rectangular boss 182 and a modified form of the spring is provided in which a central rectangular portion 184 receives the outwardly extending rectangular boss 182 on the edge 77 of the caliper 31. Fastening means, preferably in the form of a cotter key 186 couples the rectangular boss 182 to the central rectangular portion 184 of the spring. First and second axially extending portions 188 and 190 of the spring 189 extend from the rectangular portion 184 and are positioned in engagement with the edge 77 of the caliper 31. Each of these axially extending portions 188 and 190 have half loops 192 and 194 respectively, integrally formed therewith and each of these have axially extending portions 196 and 198 positioned in engagement with the shoulder 73 formed on the axially extending flange 69. The axially extending portions 196 and 198 are affixed to the axially extending flange 69 by outwardly extending tabs 200 and 202 and by suitable fasteners 204 and 206.

As the caliper 31 moves in an axial direction during braking actions with respect to the torque plate 61, the loops 192 and 194 roll so that there is substantially no resistance to the movement of the caliper 31 with respect to the torque plate 61. The spring 180 also has substantially no hysterisis and as a result the caliper will be returned to its neutral position under the impetus of the rectangular seal 41 that couples the outer surface 39 of the piston with the cylindrical bore 37.

It should be noted from an inspection of FIGURE 6 that the loop portions 192 and 194 of the spring 180 when in a relaxed state will be in the straight dotted line positions shown in that FIGURE and that when coupled to the axially extending flanges 67 and 69 they will form the rolls or loops 192 and 194.

Thus the present invention provides a very smooth acting disk brake arrangement in which the caliper 31 may slide relative to the torque plate without encountring substantial resistance in either direction. Simultaneously, the spring members 140 and 142 provide a means for supporting the caliper for slidable movement in a direction generally perpendicular to the plane of rotation of the disk. It can be appreciated therefore that while the spring members 140 and 142 provide a means for slidably supporting the caliper 31 on the stationary torque plate they also furnish little or substantially no resistance to movement of the caliper with respect to the torque plate. The same may be said with respect to the spring members 180 that couple the caliper 31 with the flanges 67 and 69.

It is to be understood, of course, that although a preferred embodiment of the invention has been shown and described, various modifications, substitutions and additions may be made thereto without departing from the spirit of the invention as encompased in the attached claims.

What is claimed is:

1. A disk brake adapted to brake a rotor supported for rotation about a rotor axis, said disk brake comprising a stationary member, a caliper supported for sliding movement relative to said stationary member in a direction parallel to the axis of rotation of the rotor, said caliper having an actuating portion disposed on one side of the rotor and a reaction portion disposed on the other side of the rotor, a first brake shoe interposed between said actuating portion and the one side of the rotor, a second brake shoe interposed between said reaction portion of said caliper and the other side of the rotor, and actuating means carried by said caliper actuating portion for urging said first brake shoe into engagement with the one side of the rotor and for reactively sliding said caliper relative to the rotor for urging said second brake shoe into engagement with the other side of the rotor by said reactive portion of said caliper, said means for supporting said caliper for sliding movement relative to said stationary member comprising spring means having a first leg operatively affixed to said caliper, a second leg operatively affixed to said stationary member and an arcuate intermediate portion, said intermediate portion being defined by a radius extending from an axis disposed substantially perpendicular to the disk axis of rotation for rolling movement of said intermediate portion of said spring means about said perpendicular axis upon sliding movement of said caliper.

2. A disk brake as set forth in claim 1 wherein the spring means comprise first and second springs positioned on opposite sides of the caliper, each of said springs having first and second legs and an intermediate portion as defined in claim 1.

3. A disk brake as set forth in claim 2 wherein the first leg of each of the spring extends in a direction parallel to the axis of rotation of the rotor and the second leg of each of the springs extends perpendicular to the first leg.

4. A disk brake as set forth in claim 2 wherein the first and second legs of each of the springs extend parallel to each other and parallel to the axis of rotation of the rotor.

5. A disk brake as set forth in claim 1 wherein the arcuate intermediate portion of the spring means lies at one end of the first leg, said spring means further including a second arcuate intermediate portion in the other end of said first leg and a third leg integrally connected to said second arcuate intermediate portion and operatively affixed to the stationary member.

6. A disk brake as set forth in claim 5 wherein the first leg has an indentation, the caliper having a boss extending into said indentation, the means for operatively affixing said first leg to said caliper comprising means for affixing said indentation to said boss.

7. A disk brake as set forth in claim 5 wherein the spring means is straight in its unstressed position, the arcuate intermediate portions being formed upon the connection of said spring means to the caliper and to the stationary member.

References Cited

UNITED STATES PATENTS 3,207,267  9/1965  Beuchle et al. _____ 188—73

FOREIGN PATENTS 953,520  3/1964  Great Britain.
994,827  6/1965  Great Britain.

MILTON BUCHLER, *Primary Examiner.*

G. E. A. HALVOSA, *Assistant Examiner.*